Nov. 7, 1939.  J. V. THOMAS  2,178,866
LIQUID LEVEL CONTROL SYSTEM
Filed May 19, 1937
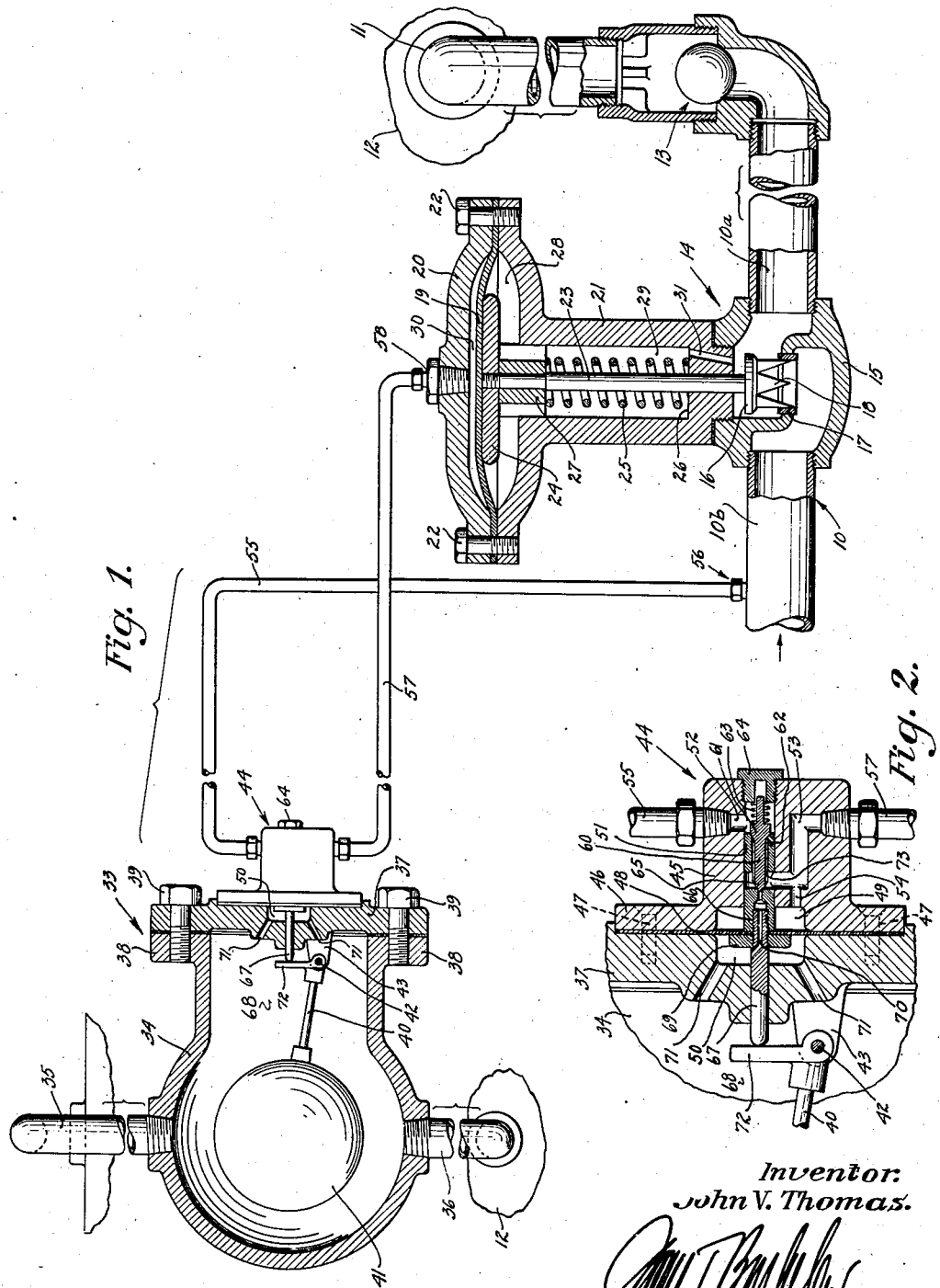
Inventor:
John V. Thomas.
Attorney.

Patented Nov. 7, 1939

2,178,866

UNITED STATES PATENT OFFICE

2,178,866

LIQUID LEVEL CONTROL SYSTEM

John V. Thomas, Altadena, Calif., assignor to Natural Gas Equipment Inc., Los Angeles, Calif., a corporation of California Application May 19, 1937, Serial No. 143,485

14 Claims. (Cl. 137—68)

This invention has to do with liquid level control systems operating to maintain a body of liquid at predetermined level by controlling the liquid supply thereto in accordance with variations in that level. It will be understood that the invention is generally applicable to liquid level control systems for various purposes and in different types of equipment, but for convenience of description I have shown and will hereinafter describe a typical embodiment of the invention in the form of a boiler feed water regulating system.

In certain of its aspects the invention may be regarded as an improvement in the type of liquid level control disclosed in Patent No. 2,013,222, issued September 3, 1935, to me on Pressure control apparatus. Generally speaking, the patented and present systems include a main control valve in the supply line leading to the liquid containing chamber, some pressure responsive means, such as a diaphragm, operatively associated with the main control valve, and a pilot valve device that operates in response to a float or other means that moves in accordance with changes in the liquid level, to control communication of a pressure fluid to the diaphragm. According to the patented system, the diaphragm operating fluid preferably comprises a gas supplied from a suitable source to the pilot valve mechanism, and the latter operates in response to movement of the float in one direction to communicate the pressure fluid to the main valve controlling diaphragm, and operates in response to opposite movement of the float to release the operating fluid pressure from the diaphragm. During the last mentioned operation the operating fluid may be released to the atmosphere or through a line to other disposition. It may also be mentioned that the patent shows a main control valve of a type requiring closely fitting parts to prevent liquid leakage from the valve body along the valve operating rod.

Among the principal objects of my present invention is to provide a system of the general character described, in which the main valve operating fluid is released or vented under control of the pilot valve, into the liquid body whose level is under control, instead of being discharged to the atmosphere or elsewhere. Preferably, and most conveniently in the majority of situations, the so-called operating fluid will consist of liquid taken from the supply line at the high pressure side of the main control valve. Thus in a boiler feed water control system, the main valve controlling diaphragm is operated by water pressure through a connection with the supply line, and as the pressure on the diaphragm is released, water is vented under control of the pilot valve into the boiler. Another important feature of the invention is the provision of both a main control valve and pilot valve mechanism so constructed as to eliminate possibility of fluid leakage and the necessity for providing stuffing boxes or accurately close fitting parts.

The above mentioned general objects of the invention, as well as additional features and the details of a typical and preferred embodiment thereof, will more fully be understood from the following description. Reference is had throughout the description to the accompanying drawing, in which:

Fig. 1 is a general view showing the float mechanism and associated parts connected to the main valve regulator; and Fig. 2 is an enlarged fragmentary view showing the pilot valve mechanism in section.

In Fig. 1, numeral 10 indicates the boiler feed water supply line connecting at 11 with the usual water chamber of a boiler, a fragmentary portion of the shell of which is indicated at 12. The supply line may contain a suitable check valve, typically shown at 13, to prevent return flow of water from the boiler. The main control valve 14 comprises a body 15 containing a valve 16 movable vertically with relation to its seat 17 to control the water supply to the boiler, the valve having a depending guide portion 18 working within the seat. The valve 16 is operated by a diaphragm 19 clamped between body sections 20 and 21 interconnected by screws 22. The valve rod 23 may be connected to or operatively associated with the diaphragm in any suitable manner, though typically it is shown to carry at its upper end a disk or plate 24 that is maintained in engagement with the diaphragm by a coil spring 25 confined between body shoulder 26 and a guide 27, the latter having a spider or other open shape permitting communication between chamber 28 beneath the diaphragm and the interior 29 of the body.

As will later appear, valve 16 is moved in a closing direction by communication of pressure fluid to chamber 30 above the diaphragm. Downward movement of the diaphragm is resisted by spring 25 which, when the pressure in chamber 30 is relieved, raises rod 23 to open the valve. Chambers 28 and 29 are placed in communication with the supply line at the low pressure side 10a of the valve by a suitable connection, for example a passage 31 in the body, so that the under side of the diaphragm 19 is at all times exposed to the pressure in 10a, and which, normally, is substantially boiler pressure. As will be apparent, this construction obviates any necessity for having to pack off or provide close fitting surfaces between the valve rod and body, to prevent liquid leakage, as is ordinarily required. The upward thrust of spring 25 need be no greater than is required for prompt operation of the valve when the pressures applied to opposite faces of the diaphragm are substantially equalized, as is the case during opening of the valve.

The float operated mechanism, generally denoted at 33, comprises a hollow housing 34 connected by pipes 35 and 36 to the water chamber of the boiler above and below the normal water level. One end of the housing is closed by a removable plate 37 attached to the housing flange 38 by screws 39. Arm 40 of the float 41 is pivotally attached at 42 to a lug, or pair of lugs 43, integral with plate 37.

The pilot valve mechanism 44 includes a combination of diaphragm and valve parts operatively associated with the float mechanism, and one of the features of the pilot valve mounting is the elimination of the necessity for a stuffing box or other packing to seal off the operative connection between the float and the pilot valve parts. Referring particularly to Fig. 2, the pilot valve mechanism advantageously may be mounted on the float housing closure plate 37 so as to be removable therefrom, and if desired, to be removable together with plate 37 from the housing 34. The mechanism 44 comprises a body 45 having an annular flange 46 fitted within and secured to plate 37 by screws 47. A diaphragm 48 having its opposite faces exposed to chambers 49 and 50, is clamped between flange 46 and the opposing face of plate 37. A bore 51, extending continuously through the body 45 from chamber 49, communicates with passages 52 and 53, the latter connecting via port 54 with chamber 49. Passage 52 is connected by line 55 with the main supply line 10 at some suitable point 56 at the high pressure side 10b of the valve 14. Passage 53 communicates with chamber 30 above diaphragm 19 in the main valve regulator by way of line 57 connecting at 58 with the top section 20 of the regulator body.

Bore 51 in the pilot valve body 45 contains a longitudinally movable compound valve element 60 having an enlarged head 61 normally engaging the outer end of a stationary tubular seat 62. The head 61 forms a valve that is yieldably held against its seat by a coil spring 63 bearing against plug 64, the latter being adjustable to vary the force of the spring. The opposite tapered end 65 of the valve element 60 seats against a tubular member 66 carried by the diaphragm and threaded on a rod 67 extending through the diaphragm and projecting into chamber 68 of the float housing. The diaphragm 48 is confined between the outer end of member 66 and nut 69, and rod 67 contains a passage 70 through which operating fluid in bore 51 is discharged into chamber 50 and thence through passages 71 into the float chamber, as will presently appear. It will be noted that valves 61 and 65 are so related in tandem arrangement that both are seated when the diaphragm 48 is in its normal or undeflected position; also that slight movement of the diaphragm in either direction will cause one or the other of the valves 61 and 65 to unseat, according to the direction in which the diaphragm is moved.

In considering the operation of the system, assume that the boiler is being filled with water and the water level therein is rising toward its normal height, and the upwardly projecting finger 72 carried by the pivoted float arm 40, is approaching engagement with the end of rod 67. During this time the main regulator valve 16 is held open by spring 25, no operating fluid being communicated to the main diaphragm chamber 30 since the valve 61 remains seated to close off the communication of operating fluid pressure to line 57. As the liquid within the boiler and float housing 34 further approaches its normal level, finger 72 comes into engagement with rod 67 and tends to move the diaphragm 48 and valve element 60 in a direction that will unseat valve 61. Such movement of the parts, however, is resisted by the operating fluid pressure applied to the surface of the diaphragm within chamber 49. Accordingly, valve 61 will remain seated until the liquid level rises to the predetermined height at which the buoyancy of the float transmits sufficient pressure to the diaphragm by way of finger 72 and rod 67, to overcome the resisting fluid pressure within chamber 49. Thereupon, valve 61 opens to permit the flow of liquid from line 55 through the clearance space 73 and passage 53 to line 57 to the main diaphragm chamber 30. The resultant application of pressure to the top surface of diaphragm 19 moves the valve 16 in a closing direction, reducing the rate of water feed to the boiler. When the normal operating liquid level is established, valve 61 closes under the influence of spring 63 to again cut off the communication of pressure from line 55 to line 57.

From the foregoing it will be apparent that a reverse sequence of operations occurs as the boiler water level drops below normal and the pilot valve and main regulator respond to restore the water level to normal. As the float lowers, finger 72 is swung away from the pilot valve assembly, causing the pressure in chamber 49 to move the diaphragm and rod 67 toward the left, unseating valve 65 and permitting liquid in line 57 to vent through passage 70 and chamber 50 into the float housing. The resultant lowering in the pressure applied to the main regulator diaphragm causes valve 16 to open under the influence of spring 25, increasing the rate of feed water supply to the boiler. The increased rate of feed continues until the normal liquid level is restored and float 41 has risen to the point at which the force applied to rod 67 by finger 72, and the pressure applied to the diaphragm in chamber 49, are in equilibrium, and valve 65 is seated to close off communication between passage 53 and the vent passage 70 extending through the diaphragm.

It should be mentioned that the pressure differential in line 10 at opposite sides of the main valve 16 is sufficient to cause the valve to close when the pressure at the inlet side 10b of the valve is communicated to diaphragm chamber 30 as described in the foregoing. That is to say, the pressure applied to diaphragm 19 from the supply line at the high pressure side 10b of the valve, will be sufficiently in excess of the combined upwardly applied pressures of spring 25 and the liquid communicated to diaphragm chamber 28, to cause the valve to close.

By reason of the operative relationship between valves 61 and 65 in the pilot valve mechanism, the entire system is made extremely sensitive in its response to variations in the normal water level. A slight raising or lowering of the water level will cause the pilot valve mechanism instantly to produce a compensating influence upon the main regulator. As a result, the system operates to maintain at all times a predetermined liquid level within a very narrow range of fluctuation.

I claim:

1. In a liquid level control system, a hollow housing having a removable end closure, a float within said housing, and a float operated valve device mounted on said housing, said device comprising a body having a fluid inlet and an outlet, a float actuated diaphragm, and valve means actuated by virtue of the float and diaphragm movement and controlling the flow of fluid from said inlet to the outlet and operating to release fluid from within said body into said housing.

2. In a liquid level control system, a hollow housing having a removable end closure, a float within said housing, and a float operated valve device mounted on said housing, said device comprising a body having a fluid inlet and an outlet, a float actuated diaphragm, and valve means actuated by virtue of the float and diaphragm movement and controlling the flow of fluid from said inlet to the outlet and operating to release fluid from within said body through the diaphragm into said housing.

3. In a liquid level control system, a hollow housing having a removable end closure, a float within said housing, and a float operated valve device applied to said closure, said device comprising a body having a fluid inlet and an outlet, a float actuated diaphragm, and valve means actuated by virtue of the float and diaphragm movement and controlling the flow of fluid from said inlet to the outlet and operating to release fluid from within said body into said housing.

4. In a liquid level control system, a hollow housing having a removable end closure, a float within said housing, and a float operated valve device applied to said closure, said device comprising a body having a fluid inlet and an outlet, a float actuated diaphragm clamped between said end closure and the body, and valve means actuated by virtue of the float and diaphragm movement and controlling the flow of fluid from said inlet to the outlet and operating to release fluid from within said body into said housing.

5. In a liquid level control system, a hollow housing having a removable end closure, a float within said housing, and a float operated valve device applied to said closure, said device comprising a body having a fluid inlet and an outlet, a float actuated diaphragm, and valve means actuated by virtue of the float and diaphragm movement and controlling the flow of fluid from said inlet to the outlet and operating to release fluid from within said body through the diaphragm into said housing.

6. In a liquid level control system, a hollow housing having a removable end closure, a float within said housing, and pivotally mounted on said end closure, and a float operated valve device applied to said closure, said device comprising a body having a fluid inlet and an outlet, a float actuated diaphragm, and valve means actuated by virtue of the float and diaphragm movement and controlling the flow of fluid from said inlet to the outlet and operating to release fluid from within said body through the diaphragm into said housing.

7. In a liquid level control system, a hollow housing, a float within said housing, and a float operated valve device, said device comprising a body having a fluid inlet and an outlet, a float actuated diaphragm, and valve means actuated by virtue of the float and diaphragm movement and controlling the flow of fluid from said inlet to the outlet and operating to release fluid from within said body into said housing.

8. In a liquid level control system, a hollow housing, a float within said housing, and a float operated valve device, said device comprising a body having a fluid inlet and an outlet, a float actuated diaphragm, and valve means including a valve movable relative to the diaphragm and actuated by virtue of the float and diaphragm movement, said valve means controlling the flow of fluid from said inlet to the outlet and operating to release fluid from within said body into said housing, and yielding means resisting movement of said valve.

9. In a liquid level control system, a hollow housing, a float within said housing, and a float operated valve device, said device comprising a body having a fluid inlet and an outlet, a float actuated diaphragm, and valve means actuated by virtue of the float and diaphragm movement and controlling the flow of fluid from said inlet to the outlet and operating to release fluid from within said body through the diaphragm into said housing.

10. In a liquid level control system, a chamber to which liquid is supplied, a float movable in accordance with variations of the liquid level in said chamber, a float operated pilot valve device comprising a body having a fluid inlet and an outlet, means for delivering chamber supply liquid to said inlet, a float actuated diaphragm, valve means actuated by virtue of the float and diaphragm movement and controlling the flow of liquid from said inlet to the outlet, and means for releasing said liquid from the body into the liquid contained in said chamber when said float assumes a predetermined level and for closing off such release of the liquid when the float assumes a different level.

11. In a system for controlling the feed of liquid to a boiler or the like, a float movable in accordance with variations of the liquid level in said boiler, a float operated pilot valve device comprising a body having a fluid inlet and an outlet, means for delivering boiler feed liquid to said inlet, a float actuated diaphragm, valve means actuated by virtue of the float and diaphragm movement and controlling the flow of liquid from said inlet to the outlet, and means for releasing liquid from said body into the liquid contained in the boiler.

12. In a system for controlling the feed of liquid to a boiler or the like, a float movable in accordance with variations of the liquid level in said boiler, a float operated pilot valve device comprising a body having a fluid inlet and an outlet, means for delivering boiler feed liquid to said inlet, a float actuated diaphragm, valve means actuated by virtue of the float and diaphragm movement and controlling the flow of liquid from said inlet to the outlet, and means for releasing liquid under control of said valve means from within said body between said inlet and outlet into the liquid contained in the boiler.

13. In a system for controlling the feed of liquid to a boiler or the like, a float movable in accordance with variations of the liquid level in said boiler, a float operated pilot valve device comprising a body having a fluid inlet and an outlet, means for delivering boiler feed liquid to said inlet, a float actuated diaphragm, valve means including a valve movable relative to the diaphragm and actuated by virtue of the float and diaphragm movement and controlling the flow of liquid from said inlet to the outlet, and means for releasing liquid under control of the valve from said body into the liquid contained in the boiler.

14. In a liquid level control system, a chamber to which liquid is supplied, a float movable in accordance with variations of the liquid level in said chamber, a float operated pilot valve device comprising a body having a fluid inlet and an outlet, means for delivering chamber supply liquid to said inlet, a float actuated diaphragm, valve means actuated by virtue of the float and diaphragm movement and controlling the flow of liquid from said inlet to the outlet, and means for releasing said liquid from the body through the diaphragm into the liquid contained in said chamber when said float assumes a predetermined level and for closing off such release of the liquid when the float assumes a different level.

JOHN V. THOMAS.